US012780023B2

(12) United States Patent
Mayer et al.

(10) Patent No.: US 12,780,023 B2

(45) Date of Patent: Nov. 3, 2026

(54) SYSTEMS FOR POWER CONVERSION AND MULTI-LEVEL INVERTER FOR ELECTRIC VEHICLE

(71) Applicant: BorgWarner Inc., Auburn Hills, MI (US)

(72) Inventors: Andreas Mayer, Clarkston, MI (US); Lathom Alexander Louco, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 6 days.

(21) Appl. No.: 18/933,362

(22) Filed: Oct. 31, 2024

(65) Prior Publication Data

US 2026/0116228 A1 Apr. 30, 2026

(51) Int. Cl.
*H02M 7/537* (2006.01)
*B60L 53/24* (2019.01)
*H02M 7/487* (2007.01)

(52) U.S. Cl.
CPC ............. *B60L 53/24* (2019.02); *H02M 7/487* (2013.01); *B60L 2210/14* (2013.01); *B60L 2210/30* (2013.01)

(58) Field of Classification Search
CPC ................................ B60L 53/24; B60L 53/30
See application file for complete search history.

(56) References Cited

U.S. PATENT DOCUMENTS 10,778,114 B2 * 9/2020 Lu .................... H03K 17/04123
11,863,098 B2 1/2024 Schafroth et al.
2012/0275203 A1 * 11/2012 Shimada ................ H02M 1/34 363/84
2013/0049657 A1 * 2/2013 Rozman .................... B60L 7/22 327/427
2022/0166305 A1 * 5/2022 Goto ....................... H02M 1/08
2022/0302820 A1 * 9/2022 Tada ..................... H02M 7/487
2024/0291396 A1 * 8/2024 Rosen ..................... B60L 50/51
2025/0135927 A1 * 5/2025 Ammanamanchi ..... B60L 53/22
2025/0260340 A1 * 8/2025 Ebrahimi Jouzdani ..................... B60L 15/007

* cited by examiner

*Primary Examiner* — Menatoallah Youssef
*Assistant Examiner* — Esayas G Yeshaw
(74) *Attorney, Agent, or Firm* — Joshua M. Haines; Bookoff McAndrews, PLLC

(57) ABSTRACT

A power conversion system includes a power converter including a plurality of switches, one or more capacitors, and a charging connector, wherein the power converter is configured to operate in each of a two-level inverter mode, a three-level inverter mode, a two-level converter mode, a three-level converter mode, an AC-DC onboard charger (OBC) mode, and a DC-DC boost converter mode.

20 Claims, 10 Drawing Sheets

SYSTEMS FOR POWER CONVERSION AND MULTI-LEVEL INVERTER FOR ELECTRIC VEHICLE

TECHNICAL FIELD

Various embodiments of the present disclosure relate generally to systems for a power converter for an electric vehicle, and, more particularly, to systems for a power converter including a multi-level inverter for an electric vehicle.

BACKGROUND

Some electric powertrain systems for electric vehicles include a battery for storing direct current, and an inverter that produces alternating current for an alternating current motor for vehicle propulsion. Some electric vehicles include an onboard charger or booster for the transformation of grid alternating current and/or boosting voltage from direct current fast charging. Therefore, the electrical network of the electrical powertrain application may include multiple independent subsystems (e.g. inverter, OBC, and DC-booster).

The present disclosure is directed to overcoming one or more of these above-referenced challenges.

SUMMARY OF THE DISCLOSURE

In some aspects, the techniques described herein relate to a power conversion system, including: a power converter including: a plurality of switches; one or more capacitors; and a charging connector; wherein the power converter is configured to operate in each of a two-level inverter mode, a three-level inverter mode, a two-level converter mode, a three-level converter mode, an AC-DC onboard charger (OBC) mode, and a DC-DC boost converter mode.

In some aspects, the techniques described herein relate to a power conversion system, wherein the power converter includes a non-isolated three-level T-type neutral-point-clamped (TNPC) voltage source inverter (VSI) topology.

In some aspects, the techniques described herein relate to a power conversion system, wherein the power converter is configured to receive an alternative current (AC) input through the charging connector while the power converter operates in the AC-DC OBC mode, and wherein the power converter is configured to receive a direct current (DC) input through the charging connector while the power converter operates in the DC-DC boost converter mode.

In some aspects, the techniques described herein relate to a power conversion system, wherein the power converter is configured to operate in an active full-bridge configuration when operating in the AC-DC OBC mode.

In some aspects, the techniques described herein relate to a power conversion system, wherein the power converter is configured to operate in an active half-bridge configuration when operating in the AC-DC OBC mode.

In some aspects, the techniques described herein relate to a power conversion system, wherein the plurality of switches include bidirectional switches including semiconductors in a monolithic configuration or a back-to-back configuration.

In some aspects, the techniques described herein relate to a power conversion system, wherein the plurality of switches are configured to operate in response to a control signal received from a controller.

In some aspects, the techniques described herein relate to a power conversion system, wherein the power converter is configured to operate in each of the two-level inverter mode, the three-level inverter mode, the two-level converter mode, the three-level converter mode, and the AC-DC OBC mode based on a switching sequence of the plurality of switches, the switching sequence performed in response to receiving the control signal.

In some aspects, the techniques described herein relate to a power conversion system, further including: a battery connected to the power converter through a battery connector, the battery configured to supply DC power to the power converter, wherein the power converter is configured to receive the DC power supplied through the battery connector while the power converter operates in the two-level inverter mode or the three-level inverter mode.

In some aspects, the techniques described herein relate to a power conversion system, wherein the power converter is configured to operate in a neutral point voltage compensation configuration or a neutral point voltage recovery configuration when operating in the three-level inverter mode.

In some aspects, the techniques described herein relate to a power conversion system, further including: a motor configured to receive AC power from the power converter to drive the motor, wherein the system is provided as a vehicle including the power converter, the battery, and the motor.

In some aspects, the techniques described herein relate to a power conversion system including: a neutral point switch; a upper switch; a lower switch; a two-level capacitor; a three-level upper capacitor; a three-level lower capacitor; three-level neutral point switches; inverter upper switches; and inverter lower switches.

In some aspects, the techniques described herein relate to a power conversion system, wherein the power conversion system is configured to operate in each of a two-level inverter mode, a three-level inverter mode, an AC-DC onboard charger (OBC) mode, a two-level converter mode, a three-level converter mode, and a DC-DC boost converter mode.

In some aspects, the techniques described herein relate to a power conversion system, wherein the power conversion system is configured to operate one or more of the upper switch, the lower switch, the inverter upper switches, or the inverter lower switches when operating in the DC-DC boost converter mode.

In some aspects, the techniques described herein relate to a power conversion system, wherein the power conversion system is configured to operate one or more of the upper switch, the lower switch, the inverter upper switches, the inverter lower switches, or the three-level neutral point switches when operating in the AC-DC OBC mode.

In some aspects, the techniques described herein relate to a power conversion system, further including: a charging connector configured to receive AC power or DC power; and a battery connector configured to receive the DC power from a battery, wherein the power conversion system is configured to receive the AC power through the charging connector while the power conversion system operates in the AC-DC OBC mode, and wherein the power conversion system is configured to receive the DC power through the charging connector while the power conversion system operates in the DC-DC boost converter mode.

In some aspects, the techniques described herein relate to a power conversion system, wherein the power conversion system is configured to operate in an active half-bridge configuration or an active full-bridge configuration when operating in the AC-DC OBC mode.

In some aspects, the techniques described herein relate to a power conversion system including: a three-level T-type neutral-point-clamped voltage source inverter for a three-phase Y-connection to a motor, wherein the three-level T-type neutral-point-clamped voltage source inverter includes: a neutral point connector for the motor, and a plurality of switches.

In some aspects, the techniques described herein relate to a power conversion system, further including: one or more capacitors; a charging connector configured to receive DC power or AC power; and a battery connector connected to a battery, the battery connector configured to receive the DC power from the battery.

In some aspects, the techniques described herein relate to a power conversion system, wherein the power conversion system is configured to: receive the DC power through the battery connector and operate in a two-level inverter mode or a three-level inverter mode to drive the motor, receive the DC power through the charging connector and operate in a DC-DC boost converter mode to charge the battery, and receive the AC power through the charging connector and operate in an AC-DC onboard charger (OBC) mode to charge the battery.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
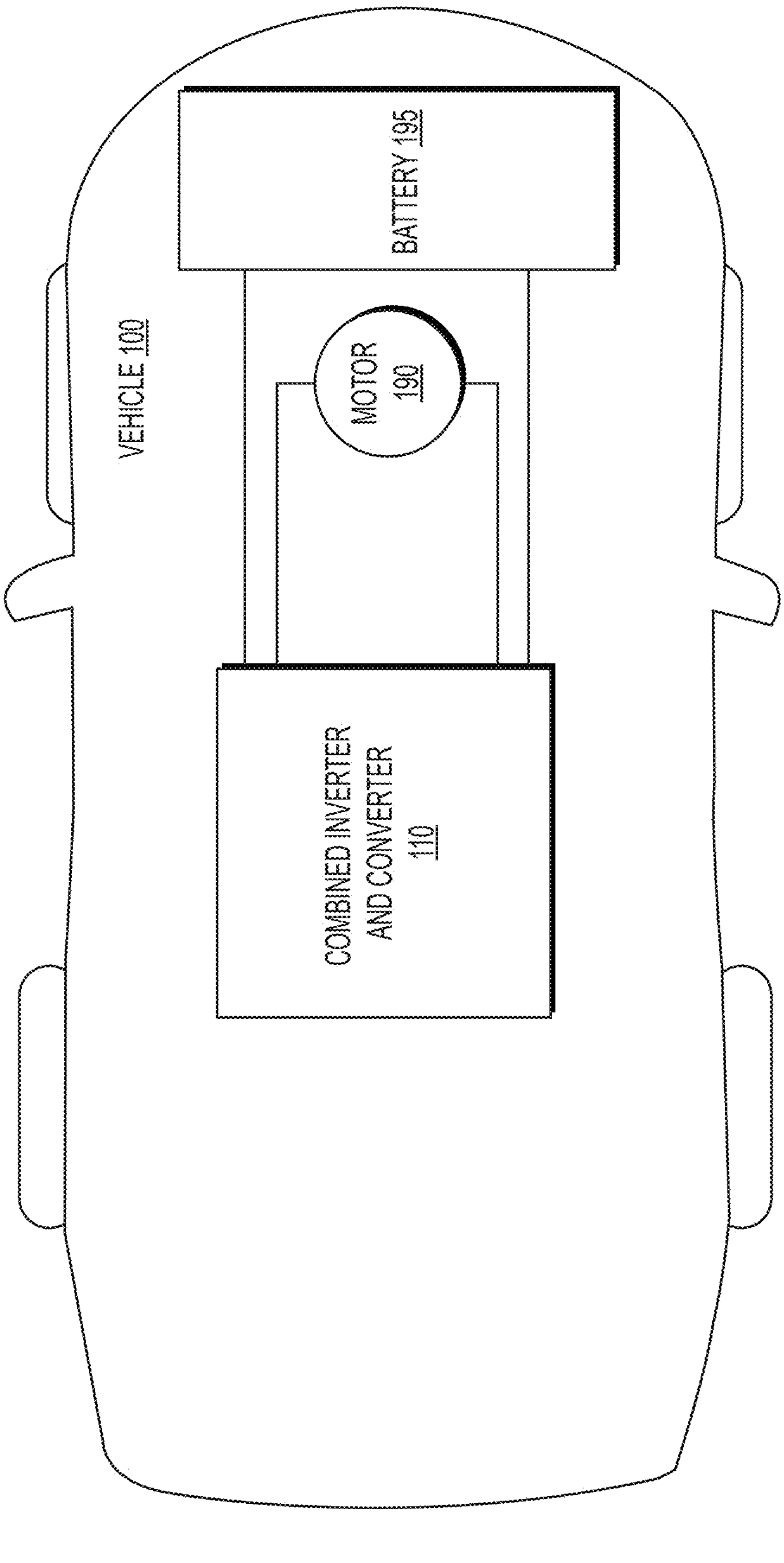
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems for a power converter for an electric vehicle, and, more particularly, to systems for a power converter including a multi-level inverter for an electric vehicle.

Semiconductor technologies including standard Si (e.g., MOSFET, IGBT, and RC-IGBT) and wide-bandgap (WDG) (SIC MOSFET, GaN HEMT, and GaN BDS) as well as standard or unique packaging (e.g., electric/thermal) keep evolving and entering increasingly automotive applications, such as propulsion (e.g., traction inverters) as well as power conversion (e.g., DC-DC onboard charger (OBC)) systems. Hence, it may be beneficial to develop economical new (e.g., multi-level inverter) and/or unique (e.g., multi-leg AC-DC) power conversion topologies.

Some battery electric vehicle (BEV) and plug-in hybrid electric vehicle (PHEV) electric powertrain systems include a battery storing direct current, and inverters producing alternating current for a vehicle propulsion (e.g., AC motor), while onboard charger/boosters are needed to transform grid alternating current and/or boosting voltage from direct current fast charging. Therefore, multiple subsystems (e.g., inverter, IBC, and DC-boosters) may be needed (or may be beneficial) within the electrical network of the electrical powertrain application, which may increase cost for lower power class applications such as compact electric vehicles (EVs) and/or PHEVs.

Since the adaptation of the North American Charging Standard (NACS) by most original equipment manufacturers (OEMs) as well as governing bodies (e.g., SAE J3400), which uses the same two primary pins for both AC charging and DC fast charging, the foundation is laid for significantly higher integration levels (e.g., game-changing advances) on the electrical design of inverters and power conversion systems. In some systems, an external charging connector may include a five-pin layout for power transfer and/or control/monitor. The five-pin layout may include: a DC+/L1 pin that provides either a positive side of a DC voltage or, when using in AC, provides either Line 1 in a split-phase connection or the sole Line in a single-phase connection; a DC-/L2 pin that provides both a negative side of a DC voltage or, when using AC, serves as either Line 2 in a split-phase connection or the neutral in a single-phase connection; a G pin that provides earth connection to vehicle chassis; a CP pin that provides digital communication; and a PP pin that carries a low voltage signal to determine connection status.

In view of the above, non-isolated onboard chargers/boosters may become more attractive and acceptable, allowing X-in-1 systems with minimum components (e.g., power semiconductors) variants and counts, enabling more economical solutions for lower power class applications.

One or more embodiments disclosed herein may include a X-in-1 power converter (e.g., a power conversion system) including a non-isolated three-level T-type neutral-point-clamped (TNPC) voltage source inverter (VSI) topology with a three-phase Y-connection (e.g., resembling an electric motor), using the motor neutral point (NP) connection (e.g., fourth leg) for voltage balance, DC-DC booster, and single phase onboard charger (OBC) by adding a fourth TNPC power stage.

FIG. 1 depicts an exemplary system infrastructure for a vehicle including a combined inverter and converter, according to one or more embodiments. Alternatively, the inverter may be an inverter without a converter. In the context of this disclosure, the inverter without a converter, or the combined inverter and converter, may be referred to as an inverter 110. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The inverter 110 may convert DC power from the battery 195 in electric vehicle 100 to AC power, to drive (e.g. rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
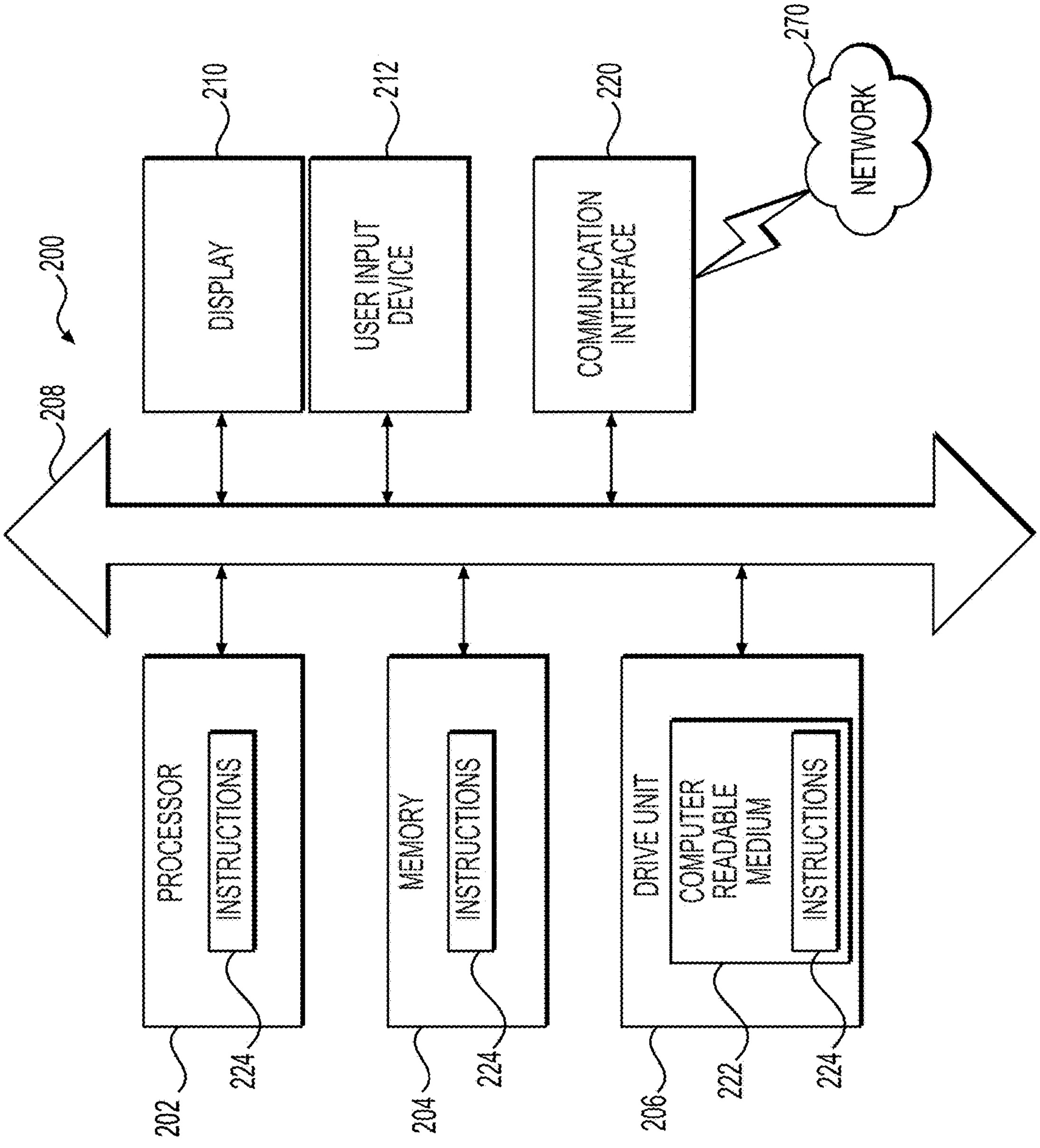
FIG. 2 depicts an exemplary system infrastructure for a controller, according to one or more embodiments.

FIG. 2 depicts an exemplary system infrastructure for a controller, according to one or more embodiments. The controller 200 may include one or more controllers. The controller 200 may include a set of instructions that can be executed to cause the controller 200 to perform any one or more of the methods or computer based functions disclosed herein. The controller 200 may operate as a standalone device or may be connected, e.g., using a network, to other computer systems or peripheral devices.

In a networked deployment, the controller 200 may operate in the capacity of a server or as a client in a server-client user network environment, or as a peer computer system in a peer-to-peer (or distributed) network environment. The controller 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 200 can be implemented using electronic devices that provide voice, video, or data communication. Further, while the controller 200 is illustrated as a single system, the term "system" shall also be taken to include any collection of systems or sub-systems that individually or jointly execute a set, or multiple sets, of instructions to perform one or more computer functions.

As depicted in FIG. 2, the controller 200 may include a processor 202, e.g., a central processing unit (CPU), a graphics processing unit (GPU), or both. The processor 202 may be a component in a variety of systems. For example, the processor 202 may be part of a standard inverter. The processor 202 may be one or more general processors, digital signal processors, application specific integrated circuits (ICs), field programmable gate arrays, servers, networks, digital circuits, analog circuits, combinations thereof, or other now known or later developed devices for analyzing and processing data. The processor 202 may implement a software program, such as code generated manually (e.g., programmed).

The controller 200 may include a memory 204 that can communicate via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random-access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the processor 202 executing the instructions stored in the memory 204. The functions, acts or tasks are independent of the particular type of instructions set, storage media, processor or processing strategy and may be performed by software, hardware, integrated circuits (ICs), firm-ware, micro-code and the like, operating alone or in combination. Likewise, processing strategies may include multiprocessing, multitasking, parallel processing and the like.

As shown, the controller 200 may further include a display 210, such as a liquid crystal display (LCD), an organic light emitting diode (OLED), a flat panel display, a solid-state display, a cathode ray tube (CRT), a projector, a printer or other now known or later developed display device for outputting determined information. The display 210 may act as an interface for the user to see the functioning of the processor 202, or specifically as an interface with the software stored in the memory 204 or in the drive unit 206.

Additionally or alternatively, the controller 200 may include an input device 212 configured to allow a user to interact with any of the components of the controller 200. The input device 212 may be a number pad, a keyboard, or a cursor control device, such as a mouse, or a joystick, touch screen display, remote control, or any other device operative to interact with the controller 200.

The controller 200 may also or alternatively include drive unit 206 implemented as a disk or optical drive. The drive unit 206 may include a computer-readable medium 222 in which one or more sets of instructions 224, e.g. software, can be embedded. Further, the instructions 224 may embody one or more of the methods or logic as described herein. The instructions 224 may reside completely or partially within the memory 204 and/or within the processor 202 during execution by the controller 200. The memory 204 and the processor 202 also may include computer-readable media as discussed above.

In some systems, the computer-readable medium 222 includes instructions 224 or receives and executes instructions 224 responsive to a propagated signal so that a device connected to a network 270 can communicate voice, video, audio, images, or any other data over the network 270. Further, the instructions 224 may be transmitted or received over the network 270 via a communication port or interface 220, and/or using a bus 208. The communication port or interface 220 may be a part of the processor 202 or may be a separate component. The communication port or interface 220 may be created in software or may be a physical connection in hardware. The communication port or interface 220 may be configured to connect with a network 270, external media, the display 210, or any other components in controller 200, or combinations thereof. The connection with the network 270 may be a physical connection, such as a wired Ethernet connection or may be established wirelessly as discussed below. Likewise, the additional connections with other components of the controller 200 may be physical connections or may be established wirelessly. The network 270 may alternatively be directly connected to a bus 208.

While the computer-readable medium 222 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 222 may be non-transitory, and may be tangible.

The computer-readable medium 222 can include a solid-state memory such as a memory card or other package that houses one or more non-volatile read-only memories. The computer-readable medium 222 can be a random-access memory or other volatile re-writable memory. Additionally or alternatively, the computer-readable medium 222 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits (ICs), programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit (IC). Accordingly, the present system encompasses software, firmware, and hardware implementations.

The controller 200 may be connected to a network 270. The network 270 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 270 may include wide area networks (WAN), such as the Internet, local area networks (LAN), campus area networks, metropolitan area networks, a direct connection such as through a Universal Serial Bus (USB) port, or any other networks that may allow for data communication. The network 270 may be configured to couple one computing device to another computing device to enable communication of data between the devices. The network 270 may generally be enabled to employ any form of machine-readable media for communicating information from one device to another. The network 270 may include communication methods by which information may travel between computing devices. The network 270 may be divided into sub-networks. The sub-networks may allow access to all of the other components connected thereto or the sub-networks may restrict access between the components. The network 270 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 3:
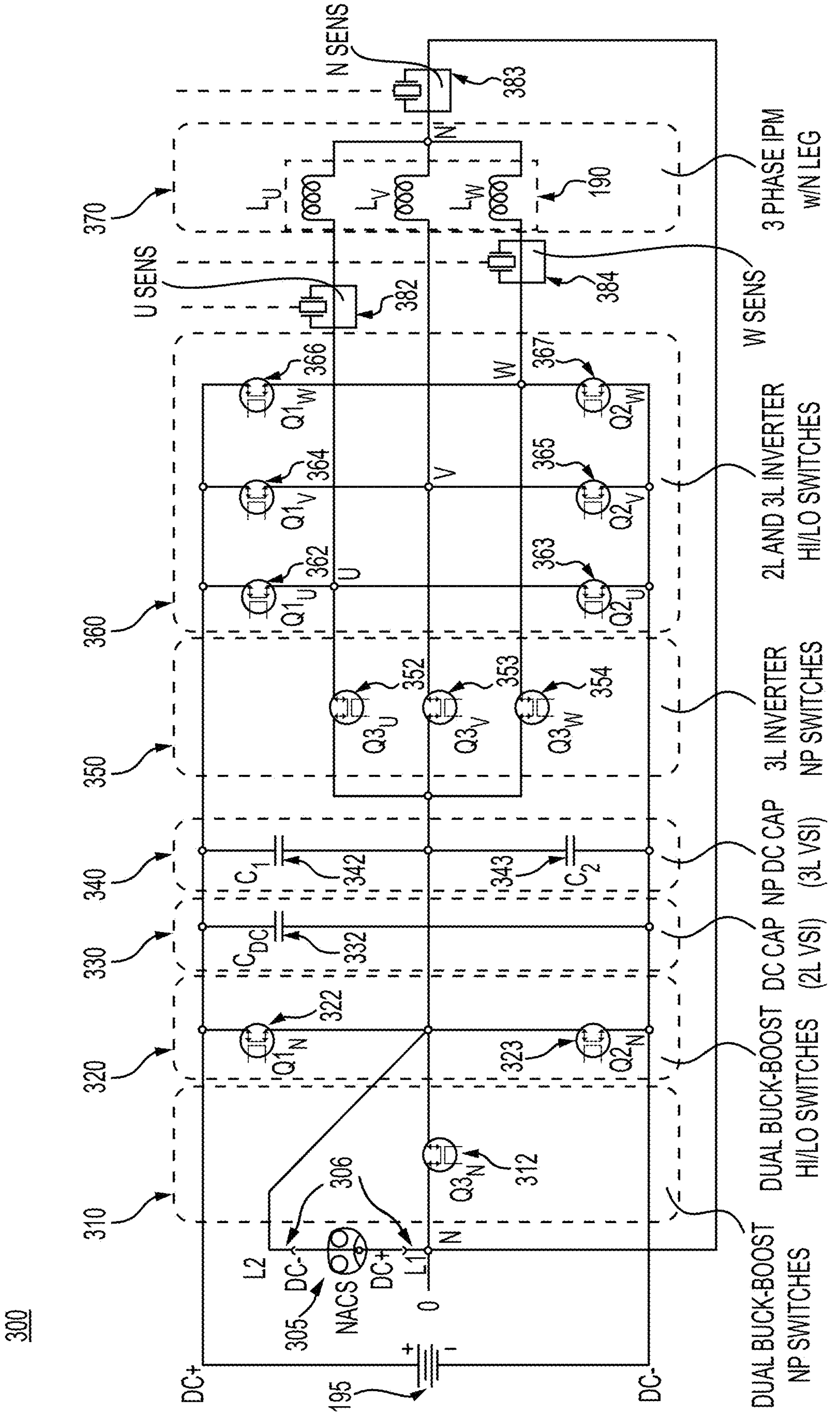
FIG. 3 depicts an electrical power schematic of a power converter, according to one or more embodiments.

FIG. 3 depicts an electrical power schematic of a power converter, according to one or more embodiments. Electrical power system 300 may be an X-in-1 power converter (e.g., a power conversion system) having a non-isolated three-level T-type neutral-point-clamped (TNPC) voltage source inverter (VSI) topology with a three-phase Y-connection (motor), using the motor neutral point (NP) connection (e.g., fourth leg) for voltage balance, DC-DC booster, and single phase onboard charger (OBC) by adding a fourth TNPC power stage.

Electrical power system 300 may include a battery connector (not depicted in FIG. 3) connected to the battery 195. The electrical power system 300 may include circuit components and elements, including a plurality of unidirectional or bidirectional switches (BDSs), capacitors, connectors, sensors, ICs, and motors, but embodiments are not limited thereto. A bidirectional switch (BDS) may include cascode GAN, a Si and/or SIC metal-oxide-semiconductor field-effect transistors (MOSFETs) and/or E-mode GaN BDSs, which may be configured and/or used in monolithic and/or back-to-back switch configuration (e.g., solid-state switch), including common-drain and/or common-source configurations (e.g., E-mode GaN BDSs and/or SIC MOSFETs back-to-back switches (solid-state switches)) Si insulated gate bipolar transistor (IGBTs), but embodiments are not limited thereto. For example, a person of skill in the art may achieve the functionalities and/or features described herein with different semiconductor components and/or elements (e.g., non-bidirectional/unidirectional and/or combination of single switches) having different semiconductor arrangements and/or configurations (e.g., switches arranged differently).

As depicted in FIG. 3, the battery 195 may be connected in parallel to BDS 322 ($Q1_N$) and BDS 323 ($Q2_N$). The BDS 322 ($Q1_N$) may be a bidirectional upper switch and the BDS 323 ($Q2_N$) may be a bidirectional lower switch. BDS 322 ($Q1_N$) and BDS 323 ($Q2_N$) may be connected in series. Charging connector 306 may be configured to connect to an external charging connector 305. The charging connector 306 may be configured to receive DC power (e.g., direct current) and/or AC power (e.g., alternating current) from the external charging connector 305. The external charging connector 305 may be configured to provide DC power and/or AC power, and may be configured to comply with standards of the electric vehicle industry (e.g., SAE J3400 standards). The charging connector 306 may include one leg (e.g., positive DC+ leg (L1)) connected to the motor 190 (e.g., 3-phase Y-connection IPM motor) and BDS 312 ($Q3_N$) through a neutral point node (N), and another leg (e.g., negative DC− leg (L2)) connected to the BDS 322 ($Q1_N$) and the BDS 323 ($Q2_N$) (e.g., connected to a node between BDS 322 ($Q1_N$) and BDS 323 ($Q2_N$)). The BDS 312 ($Q3_N$) may be a bidirectional neutral point switch, and may be connected to the BDS 322 ($Q1_N$) and the BDS 323 ($Q2_N$) (e.g., connected to the node between BDS 322 ($Q1_N$) and BDS 323 ($Q2_N$)).

As depicted in FIG. 3, the electrical power system 300 may include a plurality of capacitors, including capacitor 332 ($C_{DC}$), capacitor 342 ($C_1$), and capacitor 343 ($C_2$). The capacitor 332 ($C_{DC}$) may be a two-level capacitor (or a two-level DC bulk capacitor). The capacitor 332 ($C_{DC}$) may be connected in parallel to the BDS 322 ($Q1_N$) and the BDS 323 ($Q2_N$), and to the capacitor 342 ($C_1$) and the capacitor 343 ($C_2$). The capacitor 342 ($C_1$) may be a three-level upper capacitor and the capacitor 343 ($C_2$) may be a three-level lower capacitor. The capacitor 342 ($C_1$) and/or the capacitor 343 ($C_2$) may be a neutral point capacitor (or a neutral point DC bulk capacitor). BDS 352 ($Q3_U$), BDS 353 ($Q3_V$), and BDS 354 ($Q3_W$) may be bidirectional three-level neutral point connected switches, and may each be connected to respective phases of the motor 190 (e.g., to phases U, V, and W) and to respective BDSs that may be connected in parallel to the capacitor 342 ($C_1$) and capacitor 343 ($C_2$). For example, BDS 362 ($Q1_U$) may be connected in series with BDS 363 ($Q2_U$), and BDS 362 ($Q1_U$) and BDS 363 ($Q2_U$) may also be connected to BDS 352 ($Q3_U$); BDS 364 ($Q1_V$) may be connected in series with the BDS 365 ($Q2_V$), and BDS 364 ($Q1_V$) and BDS 365 ($Q2_V$) may also be connected to the BDS 353 ($Q3_V$); and BDS 366 ($Q1_W$) may be connected in series with BDS 367 ($Q2_W$), and BDS 366 ($Q1_W$) and BDS 367 ($Q2_W$) may also be connected to the BDS 354 ($Q3_W$). The BDS 362 ($Q1_U$), the BDS 364 ($Q1_V$), and the BDS 366 ($Q1_W$) may be bidirectional inverter upper switches. The BDS 363 ($Q2_U$), BDS 365 ($Q2_V$), and the BDS 367 ($Q2_W$) may be bidirectional inverter lower switches.

A first sensor 382 (U sensor) may be connected to a first phase (e.g., U-phase) of the motor 190 and a third sensor 384 (W sensor) may be connected to a third phase (e.g., W-phase) of the motor 190, but embodiments are not limited thereto. For example, a sensor (not depicted in FIG. 3) may be connected to the second phase (e.g., V-phase) of the motor 190, arranged similar to the first sensor 382 and the third sensor 384. A second sensor 383 (N sensor) may be connected to a neutral line of the motor 190. The first sensor 382, the second sensor 383, and the third sensor 384 may each be configured to sense and/or detect voltage, current, or any other technical parameters, and provide the sensed and/or detected parameters to an external device(s) (not shown in FIG. 3), such as the controller 200. The motor 190 may be connected through a feedback line to the neutral point node (N) that is connected to one leg (e.g., the positive DC+ leg (L1)) of the charging connector 306.

The electrical power system 300 of the X-in-1 power converter may have a non-isolated three-level T-type neutral-point-clamped (TNPC) voltage source inverter (VSI) topology that enables the X-in-1 power converter to operate in a plurality of modes (e.g., functionality and/or implementations). For example, the X-in-1 power converter may be configured to operate in each of a two-level inverter mode, a three-level inverter mode, a converter mode, an AC-DC onboard charger (OBC) mode, and a DC-DC boost converter mode, but embodiments are not limited thereto.

The electrical power system 300 of the X-in-1 power converter may include a plurality of regions configured to operate to enable different modes (e.g., functionalities and/or implementations). For example, electrical power system 300 of the X-in-1 power converter may include circuit region 310 including the BDS 312 ($Q3_N$); circuit region 320 including BDS 322 ($Q1_N$) and BDS 323 ($Q2_N$); circuit region 330 including capacitor 332 ($C_{DC}$); circuit region 340 including capacitor 342 ($C_1$) and capacitor 343 ($C_2$); circuit region 350 including BDS 352 ($Q3_U$), BDS 353 ($Q3_V$), and BDS 354 ($Q3_W$); circuit region 360 including BDS 362 ($Q1_U$), BDS 363 ($Q2_U$), BDS 364 ($Q1_V$), BDS 365 ($Q2_V$), BDS 366 ($Q1_W$), and BDS 367 ($Q2_W$); and circuit region 370 including the motor 190, but embodiments are not limited thereto. For example, more or less circuit regions may be included and/or different circuit components and/or arrangements may be included in the circuit regions.

Figure 4:
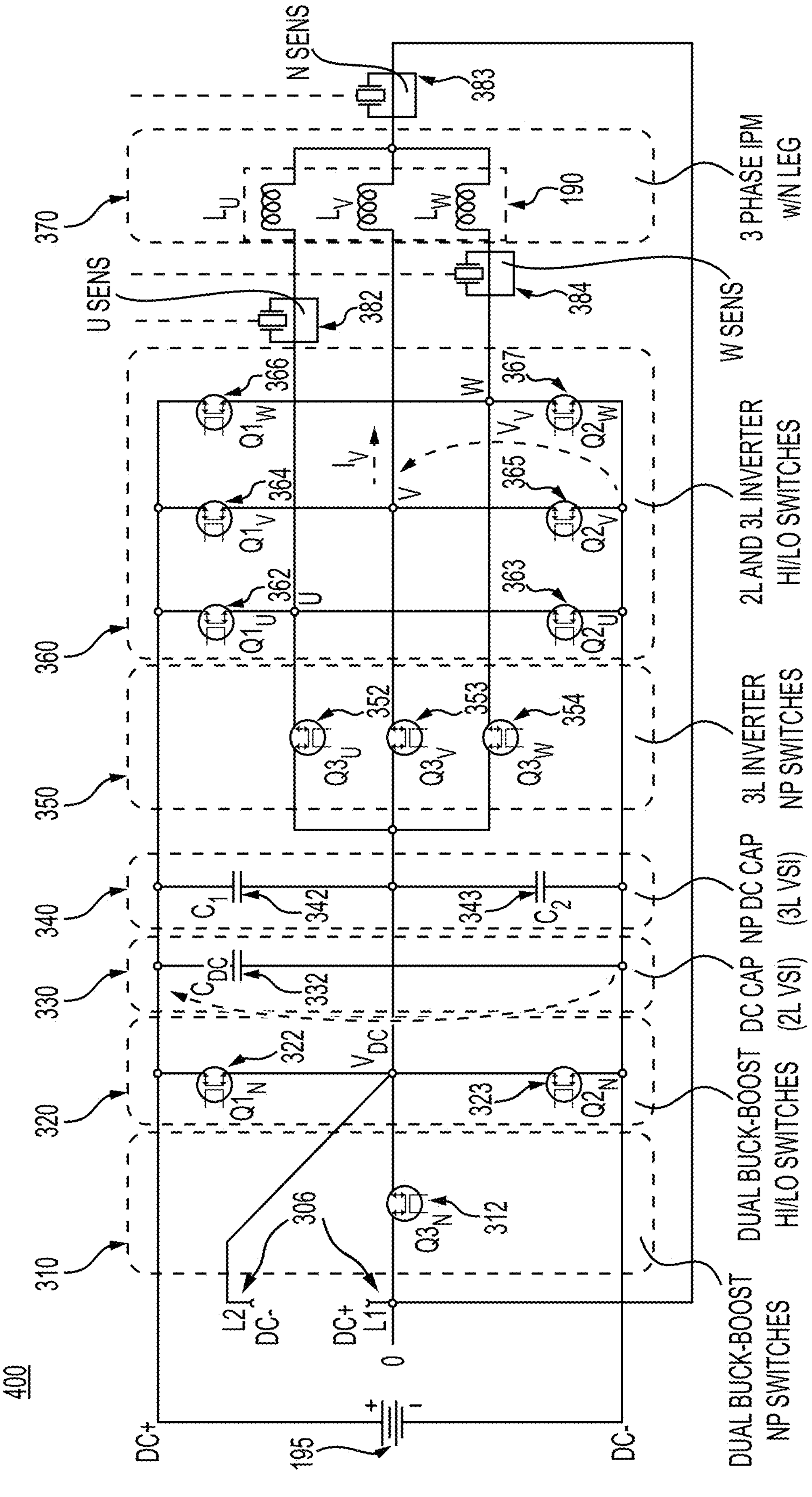
FIG. 4 depicts an electrical power schematic of a power converter in a two-level inverter mode, according to one or more embodiments.

FIG. 4 depicts an electrical power schematic of a power converter in a two-level inverter mode, according to one or more embodiments. Electrical power system 400 depicts the X-in-1 power converter of FIG. 3 during a two-level inverter mode.

During operation of the X-in-1 power converter in a two-level inverter mode, the charging connector 306 may not be connected to the external charging connector 305, and DC power may be supplied by the battery 195. A direction of a current (e.g., $I_v$) and a voltage (e.g., $V_{DC}$) are depicted by arrows in FIG. 4, but embodiments are not limited thereto. For example, current in FIG. 4 may flow in a different direction.

Controller 200 may provide one or more control signals to cause circuit components in the circuit region 360 to operate in a specific order and/or sequence (e.g., switching scheme). For example, the BDS 365 ($Q2_V$) may be operated to cause the X-in-1 power converter to operate in a two-level voltage source inverter (VSI) mode. Accordingly, DC power from the battery 195 may be inverted to AC power and provided to the motor 190 to drive and/or operate the motor 190 (e.g., to operate an electric vehicle).

Figure 5:
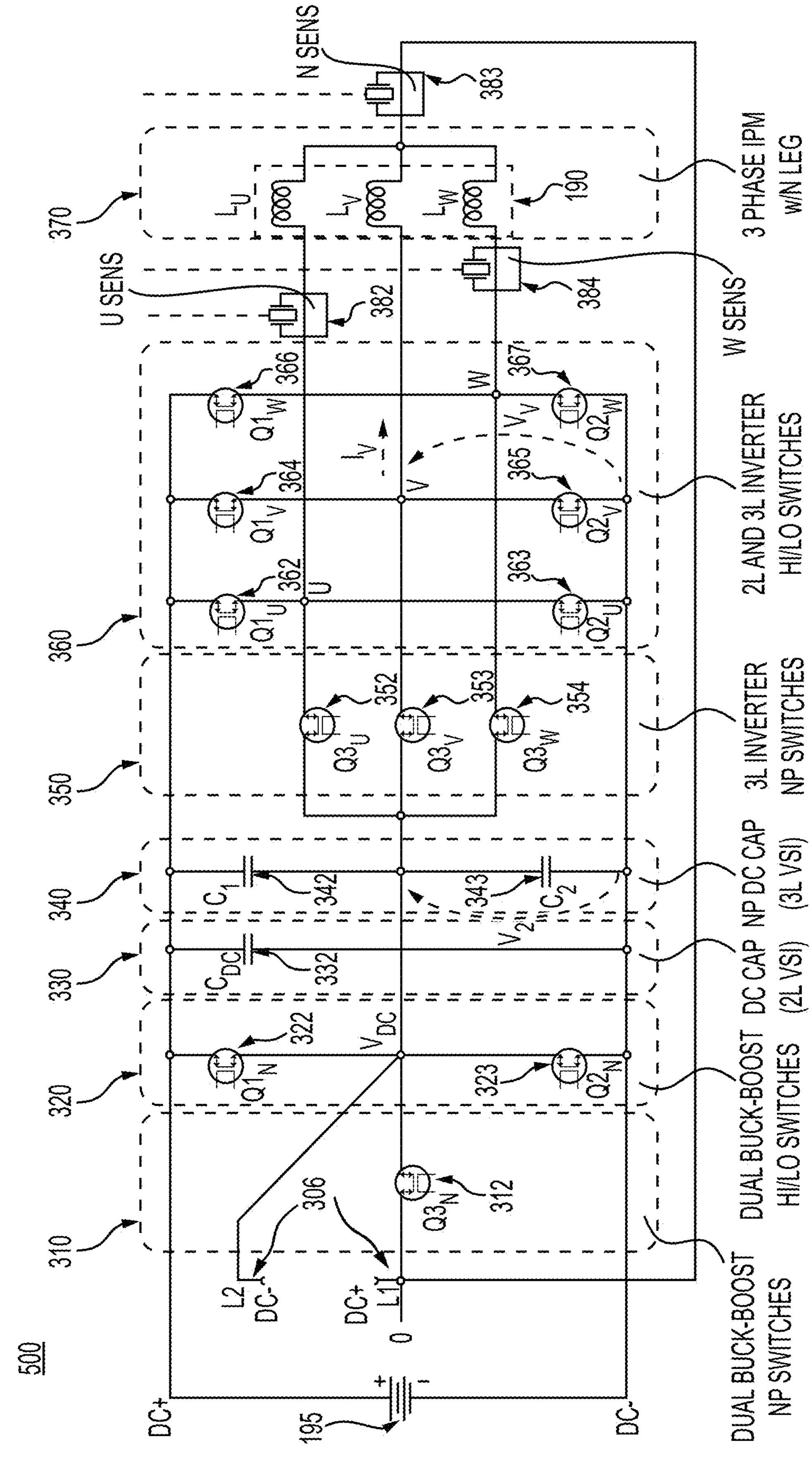
FIG. 5 depicts an electrical power schematic of a power converter in a three-level inverter mode, according to one or more embodiments.

FIG. 5 depicts an electrical power schematic of a power converter in a three-level inverter mode, according to one or more embodiments. Electrical power system 500 depicts the X-in-1 power converter of FIG. 3 during a three-level inverter mode.

During operation of the X-in-1 power converter in a three-level inverter mode, the charging connector 306 may not be connected to the external charging connector 305, and DC power may be supplied by the battery 195. A direction of a current (e.g., $I_v$) and voltages (e.g., $V_V$ and $V_2$) are depicted by arrows in FIG. 5, but embodiments are not limited thereto. For example, current in FIG. 5 may flow in a different direction.

Controller 200 may provide one or more control signals to cause circuit components in the circuit region 350 and circuit region 360 to operate in a specific order and/or sequence (e.g., switching scheme). For example, the BDS 353 ($Q3_V$) in the circuit region 350 and the BDS 365 ($Q2_V$) may be operated to cause the X-in-1 power converter to operate in a three-level voltage source inverter (VSI) mode. Accordingly, DC power from the battery 195 may be inverted to AC power and provided to the motor 190 to drive and/or operate the motor 190 (e.g., to operate an electric vehicle).

Figure 6:
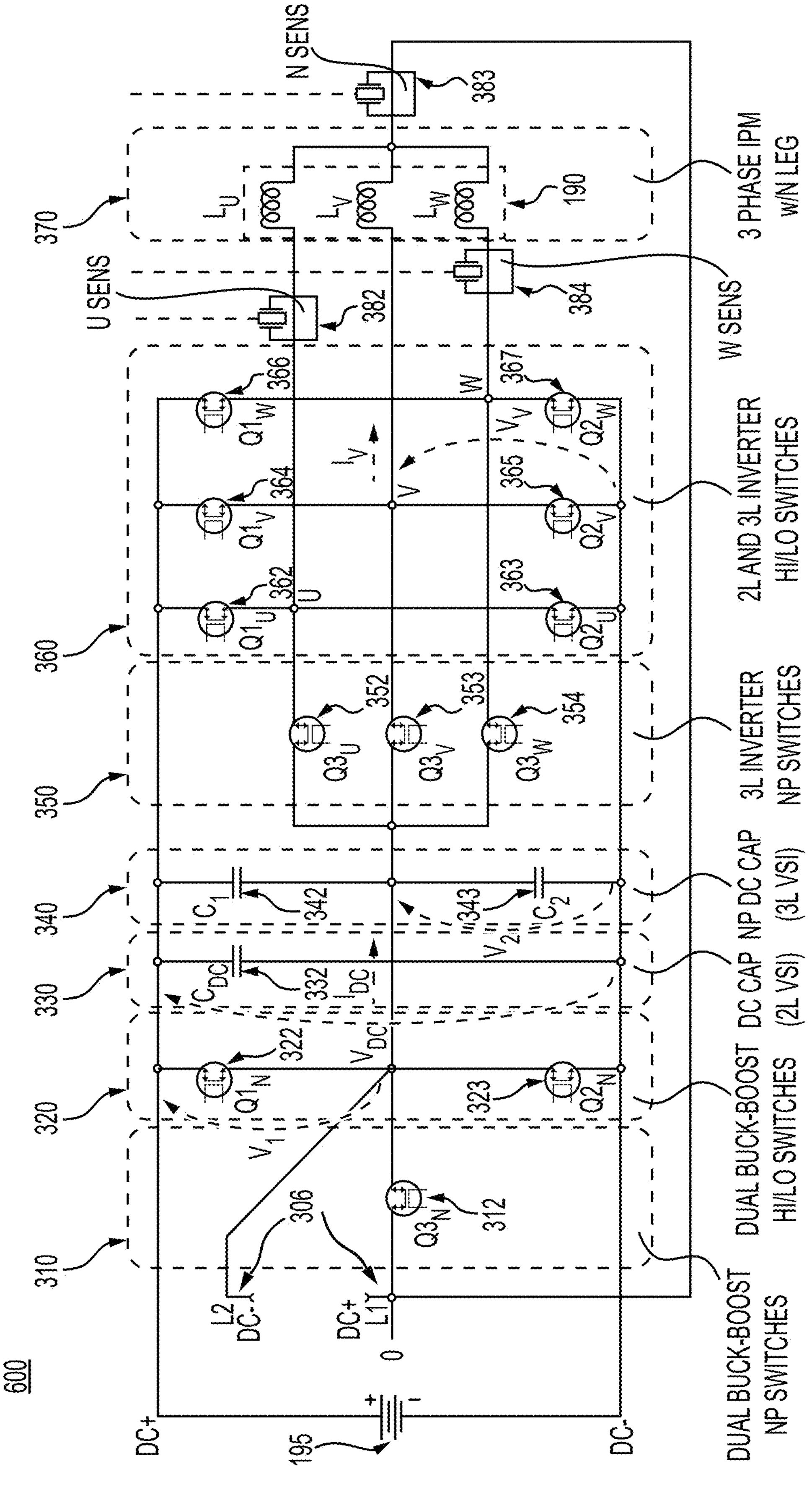
FIG. 6 depicts an electrical power schematic of a power converter in a three-level inverter mode with voltage compensation, according to one or more embodiments.

FIG. 6 depicts an electrical power schematic of a power converter in a three-level inverter mode with voltage compensation, according to one or more embodiments. Electrical power system 600 depicts the X-in-1 power converter of FIG. 3 during a three-level VSI mode with a direct $V_{DC}$ neutral point voltage compensation.

During operation of the X-in-1 power converter in a three-level VSI mode with $V_{DC}$ neutral point voltage compensation, the charging connector 306 may not be connected to the external charging connector 305, and DC power may be supplied by the battery 195. Direction of currents (e.g., $I_v$ and $I_{DC}$) and voltages (e.g., $V_1$, $V_2$, and $V_V$) are depicted by arrows in FIG. 6, but embodiments are not limited thereto. For example, current(s) in FIG. 6 may flow in a different direction.

Controller 200 may provide one or more control signals to cause circuit components in the circuit region 320, circuit region 330, circuit region 350, and circuit region 360 to operate in a specific order and/or sequence (e.g., switching scheme). For example, the BDS 322 ($Q1_N$) in the circuit region 320, the BDS 353 ($Q3_V$) in the circuit region 350, and the BDS 365 ($Q2_V$) in the circuit region 360 may be operated to cause the X-in-1 power converter to operate in a three-level VSI mode with a direct $V_{DC}$ neutral point voltage compensation. Accordingly, while DC power from the battery 195 may be inverted to AC power and provided to the motor 190 to drive and/or operate the motor 190 (e.g., to operate an electric vehicle), the $V_{DC}$ neutral point voltage compensation may also be active in an appropriate manner as to not interfere with the power flow to the motor 190.

Figure 7:
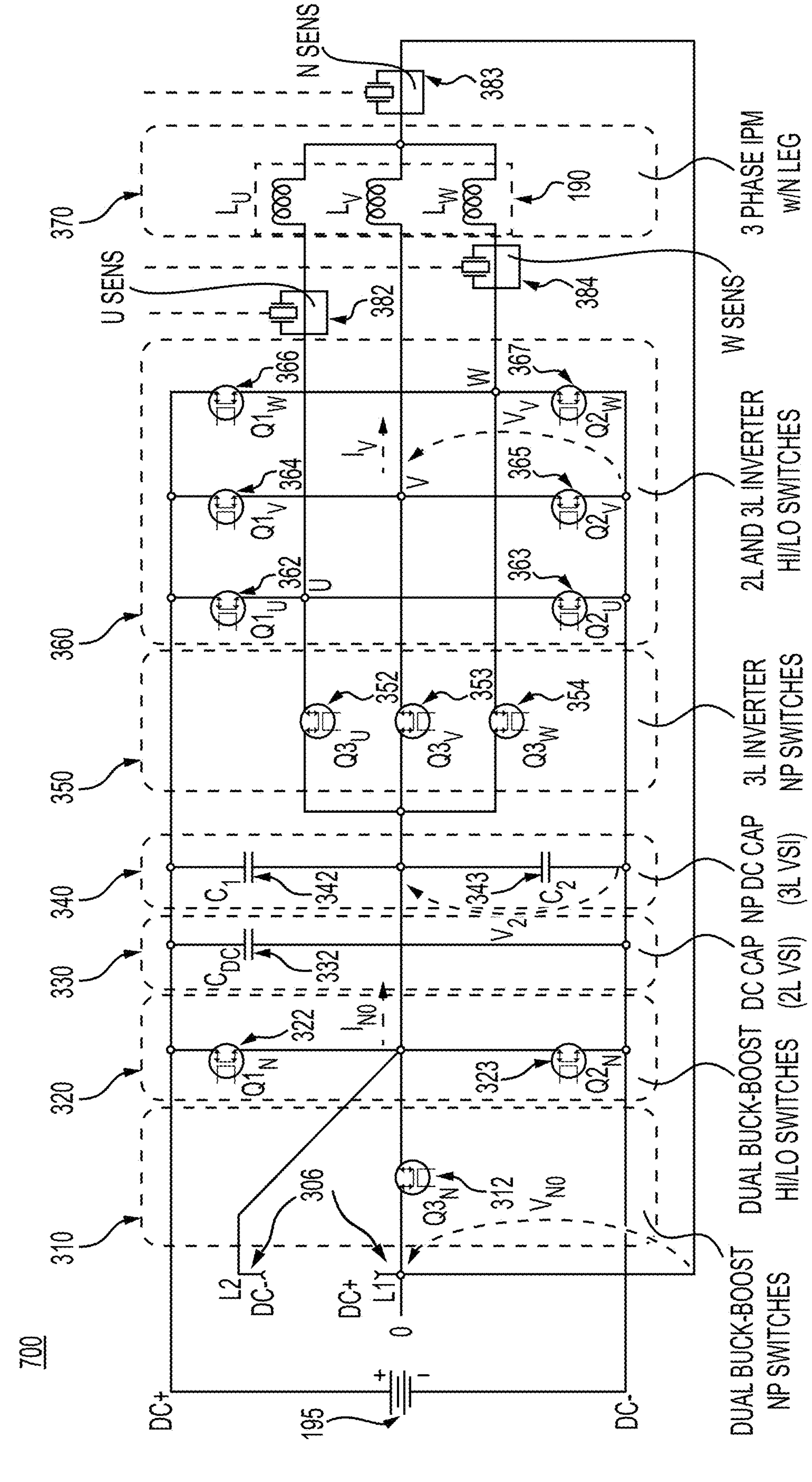
FIG. 7 depicts an electrical power schematic of a power converter in a three-level inverter mode with voltage recovery, according to one or more embodiments.

FIG. 7 depicts an electrical power schematic of a power converter in a three-level inverter mode with voltage recovery, according to one or more embodiments. Electrical power system 700 depicts the X-in-1 power converter of FIG. 3 during a three-level VSI mode with $V_{N0}$ neutral point voltage recovery from the motor's neutral leg.

During operation of the X-in-1 power converter in a three-level VSI mode with $V_{N0}$ neutral point voltage recovery, the charging connector 306 may not be connected to the external charging connector 305, and DC power may be supplied by the battery 195. Direction of currents (e.g., $I_{N0}$ and $I_V$) and voltages (e.g., $V_{N0}$, $V_2$, and $V_V$) are depicted by arrows in FIG. 7, but embodiments are not limited thereto. For example, current(s) in FIG. 7 may flow in a different direction.

Controller 200 may provide one or more control signals to cause circuit components in the circuit region 310, circuit region 340, circuit region 350, and circuit region 360 to operate in a specific order and/or sequence (e.g., switching scheme). For example, the BDS 312 ($Q3_N$) in the circuit region 310, the BDS 353 ($Q3_V$) in the circuit region 350, and the BDS 365 ($Q2_V$) in the circuit region 360 may be operated to cause the X-in-1 power converter to operate in a three-level VSI mode with $V_{N0}$ neutral point voltage recovery. Accordingly, DC power from the battery 195 may be inverted to AC power and provided to the motor 190 to drive and/or operate the motor 190 (e.g., to operate an electric vehicle), with a $V_{N0}$ neutral point voltage compensation by appropriately redirecting power flow momentarily to the capacitor 342 ($C_1$) and the capacitor 343 ($C_2$) (e.g., neutral point capacitors).

Figure 8:
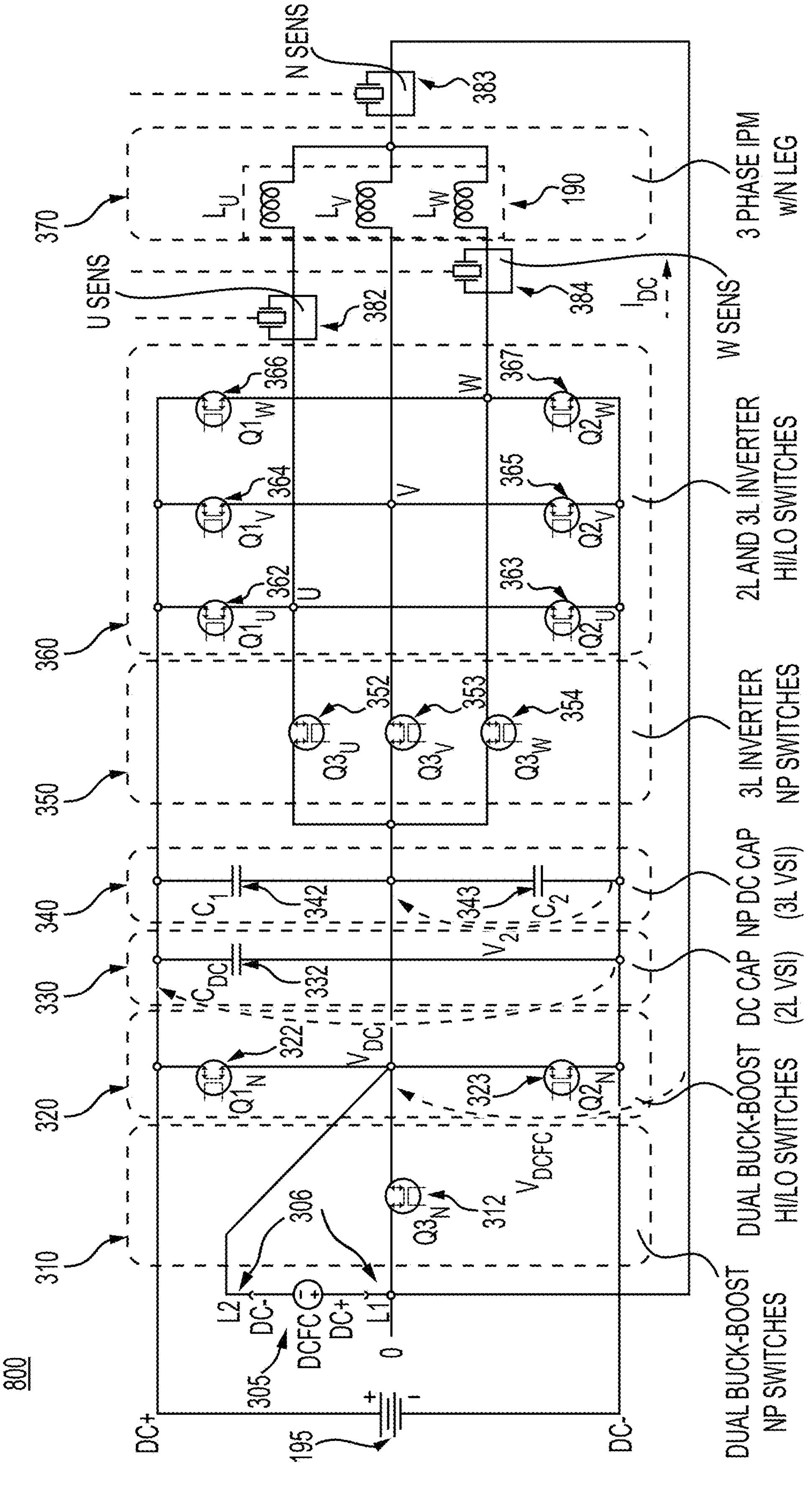
FIG. 8 depicts an electrical power schematic of a power converter in a DC to DC mode, according to one or more embodiments.

FIG. 8 depicts an electrical power schematic of a power converter in a DC to DC mode, according to one or more embodiments. Electrical power system 800 depicts the X-in-1 power converter of FIG. 3 during a unidirectional DC-DC boost converter mode (e.g., DC-DC boost converter mode).

During operation of the X-in-1 power converter in a DC-DC boost converter mode, the charging connector 306 may be connected to the external charging connector 305, and the external charging connector 305 may provide DC power. For example, the DC power provided through the external charging connector may include a DC voltage with a magnitude (e.g., approximately 400V) that is less than a voltage magnitude (e.g., approximately 800V) that may charge the battery 195. A direction of a current (e.g., $I_{DC}$) and voltages (e.g., $V_{DCFC}$, $V_{DC}$, and $V_2$) are depicted by arrows in FIG. 8, but embodiments are not limited thereto. For example, current(s) in FIG. 8 may flow in a different direction. A current (e.g., $I_{DC}$) flowing from the external charging connector 305 may flow through the motor 190 and the components in the circuit region 360 and the circuit region 320, causing the voltage input through the external charging connector 305 to be boosted (e.g., to approximately 800V) to charge the battery 195.

Controller 200 may provide one or more control signals to cause circuit components in the circuit region 320 and circuit region 360 to operate in a specific order and/or sequence (e.g., switching scheme). For example, the BDS 322 ($Q1_N$) and the BDS 323 ($Q2_N$) in the circuit region 320 and the BDS 362 ($Q1_U$), the BDS 363 ($Q2_U$), the BDS 364 ($Q1_V$), the BDS 365 ($Q2_V$), the BDS 366 ($Q1_W$), and the BDS 367 ($Q1_W$) in the circuit region 360 may be operated to cause the X-in-1 power converter to operate in a DC-DC converter mode. Accordingly, the DC voltage received from the external charging connector 305 may be boosted to charge the battery 195.

Figure 9:
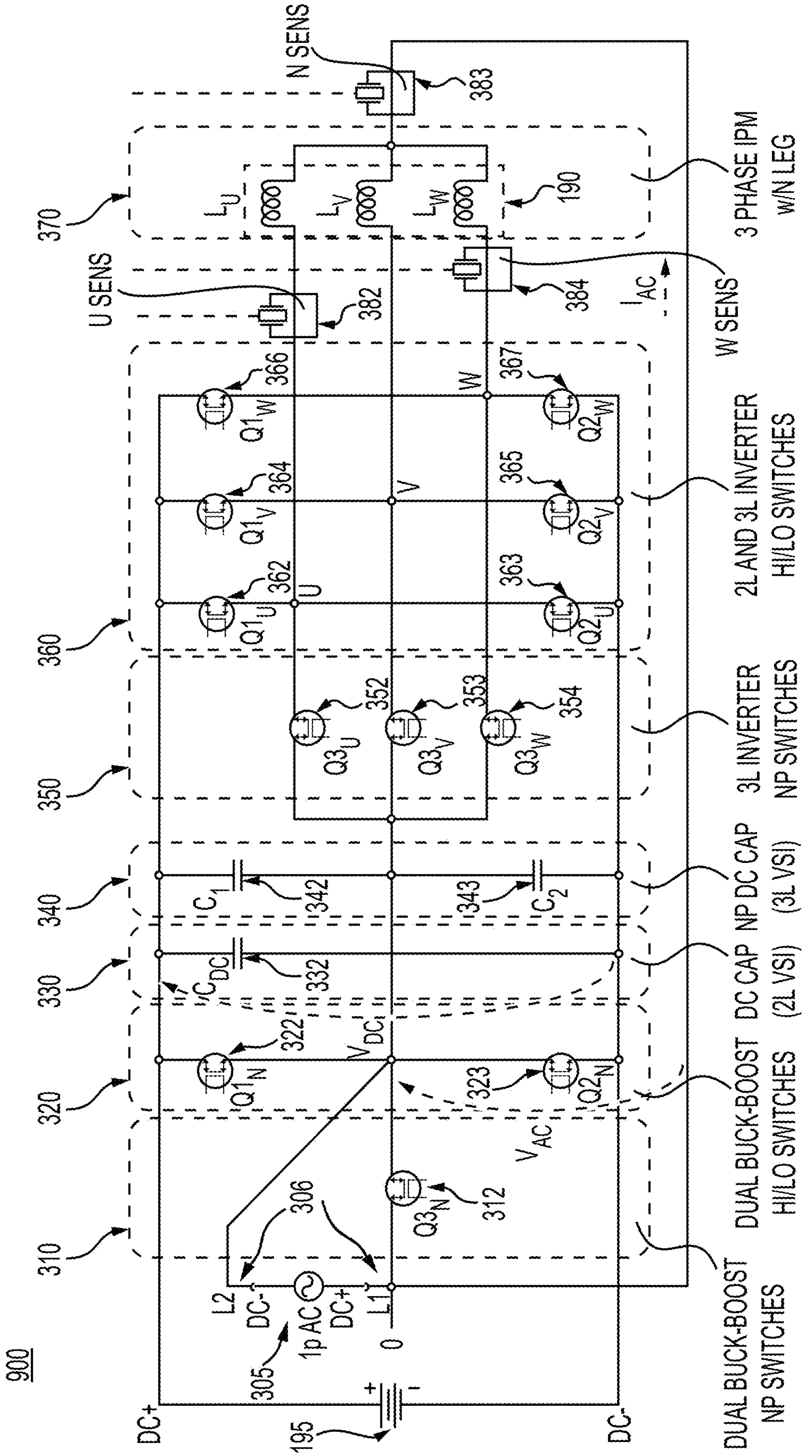
FIG. 9 depicts an electrical power schematic of a power converter in an AC to DC full-bridge mode, according to one or more embodiments.

FIG. 9 depicts an electrical power schematic of a power converter in an AC to DC full-bridge mode, according to one or more embodiments. Electrical power system 900 depicts the X-in-1 power converter of FIG. 3 during an AC-DC converter onboard charger (OBC) active full-bridge mode.

During operation of the X-in-1 power converter in an AC-DC converter OBC active full-bridge mode, the charging connector 306 may be connected to the external charging connector 305, and the external charging connector 305 may provide AC power. For example, the AC power (e.g., single phase AC power) provided through the external charging connector 305 may include an AC voltage and AC current. A direction of a current (e.g., $I_{AC}$) and voltages (e.g., $V_{AC}$ and $V_{DC}$) are depicted by arrows in FIG. 9, but embodiments are not limited thereto. For example, current(s) in FIG. 9 may flow in a different direction. A current (e.g., $I_{AC}$) flowing from the external charging connector 305 may flow through the motor 190 and a switching sequence of the components in the circuit region 360 and circuit region 320, may cause the AC power to be inverted to DC power to charge the battery 195.

Controller 200 may provide one or more control signals to cause circuit components in the circuit region 320 and circuit region 360 to operate in a specific order and/or sequence (e.g., switching scheme). For example, the BDS 322 ($Q1_N$) and the BDS 323 ($Q2_N$) in the circuit region 320 and the BDS 362 ($Q1_U$), the BDS 363 ($Q2_U$), the BDS 364 ($Q1_V$), the BDS 365 ($Q2_V$), the BDS 366 ($Q1_W$), and the BDS 367 ($Q1_W$) in the circuit region 360 may be operated to cause the X-in-1 power converter to operate in an AC-DC converter onboard charger (OBC) active full-bridge mode. Accordingly, DC power received from the external charging connector 305 may be inverted to AC power to charge the battery 195.

Figure 10:
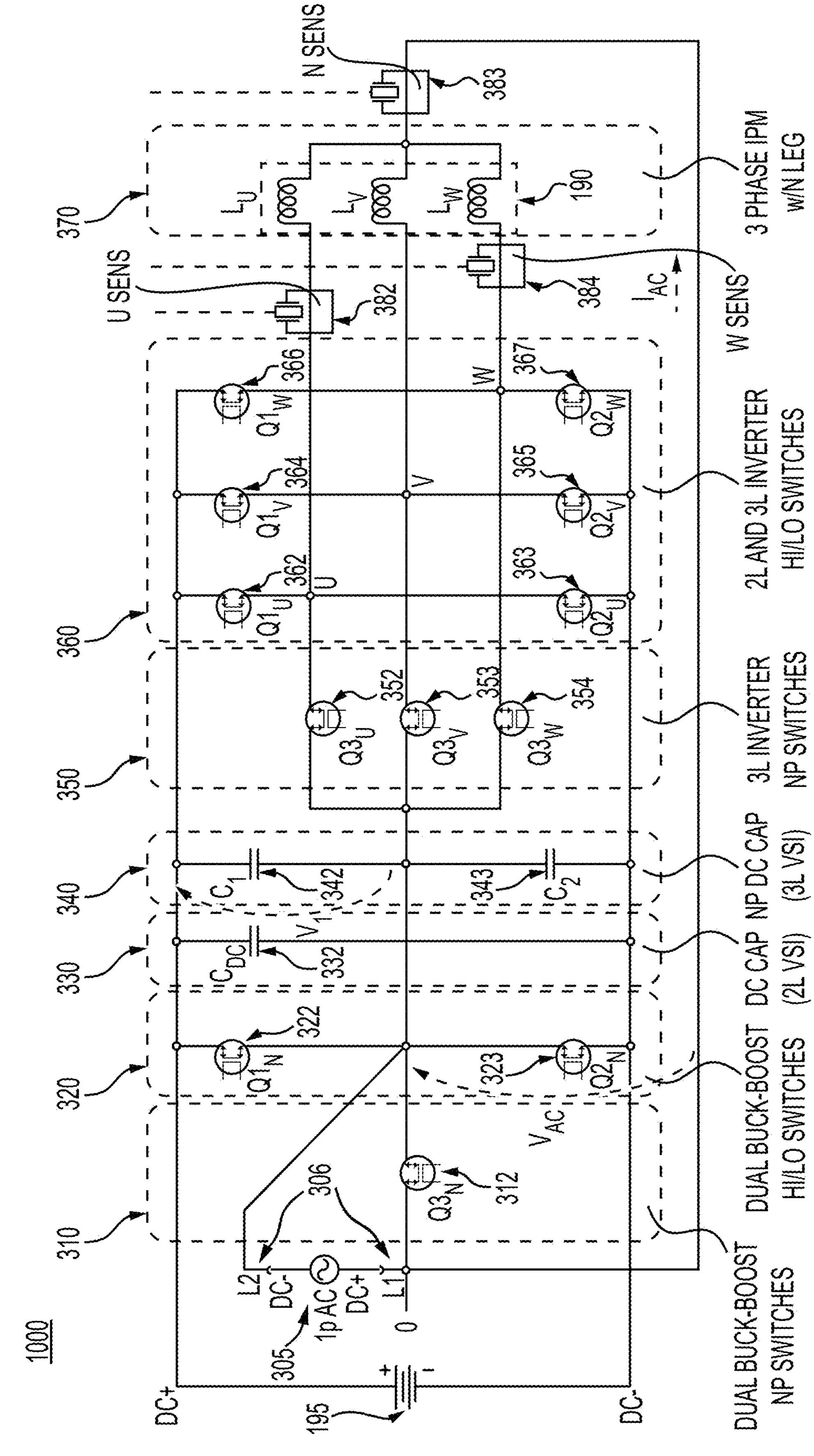
FIG. 10 depicts an electrical power schematic of a power converter in an AC to DC half-bridge mode, according to one or more embodiments.

FIG. 10 depicts an electrical power schematic of a power converter in an AC to DC half-bridge mode, according to one or more embodiments. Electrical power system 1000 depicts the X-in-1 power converter of FIG. 3 during an AC-DC converter OBC active half-bridge mode.

During operation of the X-in-1 power converter in an AC-DC converter OBC active half-bridge mode, the charging connector 306 may be connected to the external charging connector 305, and the external charging connector 305 may provide AC power. For example, the AC power provided through the external charging connector may include an AC voltage and an AC current. A direction of a current (e.g., $I_{AC}$) and voltages (e.g., $V_{AC}$ and $V_1$) are depicted by arrows in FIG. 10, but embodiments are not limited thereto. For example, current(s) in FIG. 10 may flow in a different direction. A current (e.g., $I_{AC}$) flowing from the external charging connector 305 may flow through the motor 190 and a switching sequence of the components in the circuit region 360 and circuit region 350, may cause the AC power to be inverted to DC power to charge the battery 195.

Controller 200 may provide one or more control signals to cause circuit components in the circuit region 350 and circuit region 360 to operate in a specific order and/or sequence (e.g., switching scheme). For example, the BDS 352 ($Q3_U$), the BDS 353 ($Q3_V$), and the BDS 354 ($Q3_W$) in the circuit region 350, and the BDS 362 ($Q1_U$), the BDS 363 ($Q2_U$), the BDS 364 ($Q1_V$), the BDS 365 ($Q2_V$), the BDS 366 ($Q1_W$), and the BDS 367 ($Q1_W$) in the circuit region 360 may be operated to cause the X-in-1 power converter to operate in an AC-DC converter OBC active half-bridge mode. Accordingly, DC power received from the external charging connector 305 may be inverted to AC power to charge the battery 195.

One or more embodiments disclosed herein may include a X-in-1 power converter (e.g., a power conversion system) including a non-isolated three-level T-type neutral-point-clamped (TNPC) voltage source inverter (VSI) topology with a three-phase Y-connection (motor), using the motor neutral point (NP) connection (e.g., fourth leg) for voltage balance, DC-DC booster, and single phase onboard charger (OBC) by adding a fourth TNPC power stage. In one or more embodiments, a TNPC topology may enable a X-in-1 power converter to be configured to operate in each of a two-level inverter mode, a three-level inverter mode, a converter mode, an onboard charger (OBC) mode, a DC-DC booster converter mode, and a DC-DC boost converter mode, but embodiments are not limited thereto.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A power conversion system, comprising:
a power converter including:
a plurality of switches;
one or more capacitors; and
a charging connector;
wherein the power converter is configured to operate in each of a two-level inverter mode, a three-level inverter mode, a two-level converter mode, a three-level converter mode, an AC-DC onboard charger (OBC) mode, and a DC-DC boost converter mode.

2. The power conversion system of claim 1, wherein the power converter includes a non-isolated three-level T-type neutral-point-clamped (TNPC) voltage source inverter (VSI) topology.

3. The power conversion system of claim 1, wherein the power converter is configured to receive an alternative current (AC) input through the charging connector while the power converter operates in the AC-DC OBC mode, and
wherein the power converter is configured to receive a direct current (DC) input through the charging connector while the power converter operates in the DC-DC boost converter mode.

4. The power conversion system of claim 3, wherein the power converter is configured to operate in an active full-bridge configuration when operating in the AC-DC OBC mode.

5. The power conversion system of claim 3, wherein the power converter is configured to operate in an active half-bridge configuration when operating in the AC-DC OBC mode.

6. The power conversion system of claim 1, wherein the plurality of switches include bidirectional switches including semiconductors in a monolithic configuration or a back-to-back configuration.

7. The power conversion system of claim 1, wherein the plurality of switches are configured to operate in response to a control signal received from a controller.

8. The power conversion system of claim 7, wherein the power converter is configured to operate in each of the two-level inverter mode, the three-level inverter mode, the two-level converter mode, the three-level converter mode, and the AC-DC OBC mode based on a switching sequence of the plurality of switches, the switching sequence performed in response to receiving the control signal.

9. The power conversion system of claim 1, further comprising:

a battery connected to the power converter through a battery connector, the battery configured to supply DC power to the power converter, wherein the power converter is configured to receive the DC power supplied through the battery connector while the power converter operates in the two-level inverter mode or the three-level inverter mode.

10. The power conversion system of claim 9, wherein the power converter is configured to operate in a neutral point voltage compensation configuration or a neutral point voltage recovery configuration when operating in the three-level inverter mode.

11. The power conversion system of claim 9, further comprising:

a motor configured to receive AC power from the power converter to drive the motor, wherein the system is provided as a vehicle including the power converter, the battery, and the motor.

12. A power conversion system comprising:

a neutral point switch;

a upper switch;

a lower switch;

a two-level capacitor;

a three-level upper capacitor;

a three-level lower capacitor;

three-level neutral point switches;

inverter upper switches; and inverter lower switches.

13. The power conversion system of claim 12, wherein the power conversion system is configured to operate in each of a two-level inverter mode, a three-level inverter mode, an AC-DC onboard charger (OBC) mode, a two-level converter mode, a three-level converter mode, and a DC-DC boost converter mode.

14. The power conversion system of claim 13, wherein the power conversion system is configured to operate one or more of the upper switch, the lower switch, the inverter upper switches, or the inverter lower switches when operating in the DC-DC boost converter mode.

15. The power conversion system of claim 13, wherein the power conversion system is configured to operate one or more of the upper switch, the lower switch, the inverter upper switches, the inverter lower switches, or the three-level neutral point switches when operating in the AC-DC OBC mode.

16. The power conversion system of claim 13, further comprising:

a charging connector configured to receive AC power or DC power; and a battery connector configured to receive the DC power from a battery, wherein the power conversion system is configured to receive the AC power through the charging connector while the power conversion system operates in the AC-DC OBC mode, and wherein the power conversion system is configured to receive the DC power through the charging connector while the power conversion system operates in the DC-DC boost converter mode.

17. The power conversion system of claim 15, wherein the power conversion system is configured to operate in an active half-bridge configuration or an active full-bridge configuration when operating in the AC-DC OBC mode.

18. A power conversion system comprising: a three-level T-type neutral-point-clamped voltage source inverter for a three-phase Y-connection to a motor, wherein the three-level T-type neutral-point-clamped voltage source inverter includes: a neutral point connector for the motor, wherein the neutral point connector provides a neutral voltage to a neutral node of the motor and a plurality of switches.

19. The power conversion system of claim 18, further comprising:

one or more capacitors;

a charging connector configured to receive DC power or AC power; and a battery connector connected to a battery, the battery connector configured to receive the DC power from the battery.

20. The power conversion system of claim 19, wherein the power conversion system is configured to:

receive the DC power through the battery connector and operate in a two-level inverter mode or a three-level inverter mode to drive the motor, receive the DC power through the charging connector and operate in a DC-DC boost converter mode to charge the battery, and receive the AC power through the charging connector and operate in an AC-DC onboard charger (OBC) mode to charge the battery.

* * * * *